W. TREUSHEL.
SURFACE GAGE.
APPLICATION FILED JAN. 4, 1915.
1,184,791.
Patented May 30, 1916.
Fig. 1.
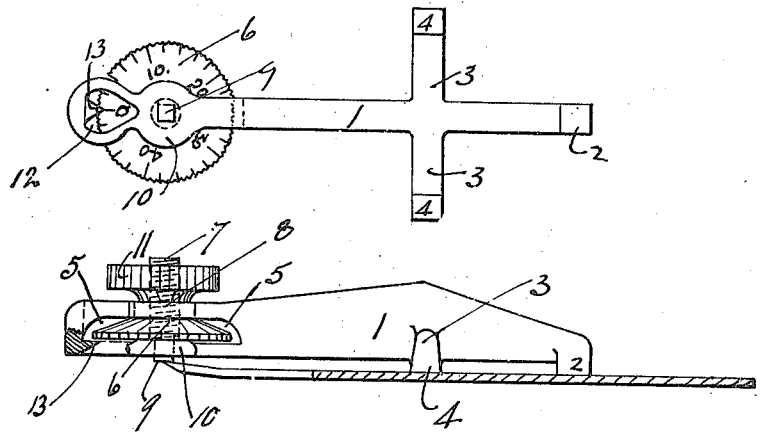
Fig. 2.
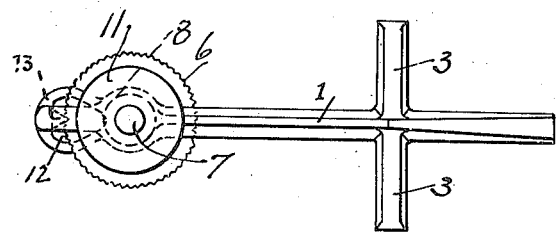
Fig. 3.
WITNESSES:
Frank H. Fowler.
Winifred Knopf.
INVENTOR
William Treushel
BY
Fred P. Gorin
ATTORNEY

UNITED STATES PATENT OFFICE.

WILLIAM TREUSHEL, OF MAPLE VALLEY, WASHINGTON.

SURFACE-GAGE.

1,184,791.  Specification of Letters Patent.  Patented May 30, 1916.

Application filed January 4, 1915. Serial No. 360.

*To all whom it may concern:*

Be it known that I, WILLIAM TREUSHEL, a citizen of the United States, and a resident of Maple Valley, in the county of King and State of Washington, have invented certain new and useful Improvements in Surface-Gages, of which the following is a full, true, and exact specification.

My invention relates to surface gages of that particular class which is adaptable to be used as saw gages, and has for its principal object; to provide an improved adjustable, direct reading indicating gage of the above general description.

Other objects will appear as my invention is more fully explained in the following specification, illustrated in the accompanying drawings and pointed out in the appended claim.

In the drawings, Figure 1 is a bottom plan of my device. Fig. 2 is a side elevation of same shown gaging a saw, with parts broken away. Fig. 3 is a top plan view of same.

Referring more particularly to the drawings, numeral 1 designates a frame member having a downwardly extending leg 2 on one end and two outstanding arms 3 which are provided with legs 4 similar to legs 2. Legs 2 and 4 are finished on the end to a true bearing surface. The other end of body 1 is cored at 5 to receive a circular disk 6 which is provided with a direct reading scale along the outer edge of its lower face. The periphery of disk 6 may be milled if desired to facilitate being turned by the thumb and finger. Disk 6 has a centrally threaded hole which screws onto a screw 7 which passes through a hole in the upper portion 8 of body 1. The lower end of screw 7 is shouldered and squared as at 9 and is adapted to fit into and extend through a square hole in the bottom part 10 of body 1. A knurled thumb nut 11 screws onto screw 7 and is adapted to lock said screw and thereby the disk 6 in any desired position. The extreme outer end of the body is provided with a reading opening 12 and an indicating point 13 which extends slightly beyond the edge of disk 6 and fits down closely to the face of said disk so as to indicate more clearly the exact reading on the disk 6.

The operation of my device is as follows: The thumb nut 11 is loosened and the disk 6 rotated and set to read the desired amount of extension of squared point 9 below the lower surface of body 1. Thumb nut 11 is screwed down until it clamps screw 7 and disk 6 solidly against movement. The gage is now ready for use as shown in Fig. 2, the gage point 9 being placed upon the extreme end of the tooth to be gaged. If the gage now sets solidly on all four bearing points, namely 2, 4 and 9, it indicates that the tooth being gaged has the desired "set", but if the gage rocks on legs 4 as bearing points, it indicates that the tooth has not enough "set", while if the gage rocks sidewise about leg 2 and point 9, it indicates too much "set" of the tooth. It will be understood that it is very desirable that all teeth of a saw have exactly the same "set" and that it is a difficult operation. It is desirable to give different "sets" to saws which are to be used for different work and that my gage may be set to gage any desired "set" of teeth.

While I have shown a particular form of embodiment of my invention, I am aware that many minor changes therein will readily suggest themselves to others skilled in the art, without departing from the spirit and scope of the invention, and I therefore desire to avoid being limited to the exact form shown and described, except as defined in the appended claim.

Having described my invention, what I claim as new and desire to protect by Letters Patent, is—

In an article of the class described, the combination of a cored body, projections which extend from the body and which are intermediate the ends thereof, supporting legs upon the ends of the said projections and a similar leg upon one end of the body, all of the said legs being rigid with the body and all of which project the same distance below the body, another leg and means for adjusting the same with respect to the body, the said means including a disk provided with a scale, a screw shaft passing through the said body, the said disk being provided with a screw threaded opening which coöperates with the said screw shaft and revoluble within the said cored portion of the body, and a binding nut mounted upon the shaft and which coöperates with the said disk to hold the latter against movement.

WILLIAM TREUSHEL.

Witnesses:
R. D. SMALLEY,
WINIFRED KNAPP.